United States Patent
Ishida et al.

(10) Patent No.: US 7,927,186 B2
(45) Date of Patent: Apr. 19, 2011

(54) METHOD FOR PRODUCING GLASS SUBSTRATE FOR MAGNETIC DISK

(75) Inventors: Mizuho Ishida, Chiyoda-ku (JP); Kara Yoshida, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/503,960

(22) Filed: Jul. 16, 2009

(65) Prior Publication Data
US 2009/0275268 A1 Nov. 5, 2009

Related U.S. Application Data

(63) Continuation of application No. PCT/JP2009/050889, filed on Jan. 21, 2009.

(30) Foreign Application Priority Data

Jan. 30, 2008 (JP) .................................. 2008-019118

(51) Int. Cl.
*B24B 49/00* (2006.01)
(52) U.S. Cl. ................ 451/21; 451/36; 451/56; 451/443
(58) Field of Classification Search .............. 451/8, 21, 451/36, 37, 41, 56, 285, 287, 443; 428/846.9
See application file for complete search history.

(56) References Cited

U.S. PATENT DOCUMENTS

| | | | |
|---|---|---|---|
| 6,354,915 B1 * | 3/2002 | James et al. | 451/41 |
| 6,932,677 B2 | 8/2005 | Nakano et al. | |
| 7,037,184 B2 * | 5/2006 | Petroski et al. | 451/532 |
| 7,104,868 B2 * | 9/2006 | Suzuki | 451/28 |
| 7,172,963 B2 * | 2/2007 | Yamada et al. | 438/626 |
| 7,488,236 B2 * | 2/2009 | Shimomura et al. | 451/41 |
| 7,500,904 B2 * | 3/2009 | Minami et al. | 451/56 |

(Continued)

FOREIGN PATENT DOCUMENTS

JP 2001-148116 5/2001

(Continued)

OTHER PUBLICATIONS

U.S. Appl. No. 12/628,484, filed Dec. 1, 2009, Ishida, et al.

(Continued)

*Primary Examiner* — Eileen P. Morgan
(74) *Attorney, Agent, or Firm* — Oblon, Spivak, McClelland, Maier & Neustadt, L.L.P.

(57) ABSTRACT

In the production of a glass substrate for magnetic disk, the present invention provides a method for producing a glass substrate for magnetic disk including a step of polishing a main surface of a circular glass substrate using a polishing pad made of a foamed resin while feeding a polishing liquid containing an abrasive, in which a polishing pad made of a foamed resin having an international rubber hardness of 45 IRHD or less, the hardness being measured at a dry state before contact with a slurry by the M method defined in JIS K6253, is used as a starting polishing pad and polishing is started after a polishing surface of the starting polishing pad is subjected to a dressing treatment to adjust the pad so that an open pore area ratio is 8% or more and an average circle equivalent diameter of open pores is 10 μm or more, in order to suppress an increase in roll-off in the polishing step of the main surface of the circular glass plate.

4 Claims, 1 Drawing Sheet

U.S. PATENT DOCUMENTS

| | | | |
|---|---|---|---|
| 7,651,761 B2 * | 1/2010 | Shimomura et al. | 428/304.4 |
| 2004/0192175 A1 * | 9/2004 | Nakano et al. | 451/41 |
| 2009/0221216 A1 * | 9/2009 | Fujita | 451/56 |

FOREIGN PATENT DOCUMENTS

| | | |
|---|---|---|
| JP | 2003-100681 | 4/2003 |
| JP | 2003-243343 | 8/2003 |
| JP | 2004-303281 | 10/2004 |
| JP | 2005-66781 | 3/2005 |
| JP | 2005-120253 | 5/2005 |
| JP | 2006-35367 | 2/2006 |
| JP | 2006-233174 | 9/2006 |
| JP | 2007-160474 | 6/2007 |
| JP | 2007-250166 | 9/2007 |
| JP | 2007-257811 | 10/2007 |

OTHER PUBLICATIONS

U.S. Appl. No. 12/477,197, filed Jun. 3, 2009, Ishida, et al.
Office Action dated Nov. 22, 2010, in Chinese Patent Application No. 200980000070.4 (with English-language translation).

* cited by examiner

METHOD FOR PRODUCING GLASS SUBSTRATE FOR MAGNETIC DISK

TECHNICAL FIELD

The present invention relates to a method for producing a glass substrate for magnetic disk. More specifically, it relates to a method for polishing a main surface of a circular glass plate.

BACKGROUND ART

Recently, a demand for high recording density has been increased on a magnetic disk to be mounted on information processing devices such as a hard disk drive. Under such a situation, a glass substrate excellent in flatness and substrate strength has been widely used in place of conventional aluminum substrates.

For example, the glass substrate for magnetic disk is produced by making a circular hole in the center of a circular glass plate, successively performing chamfering, main surface lapping, and end surface mirror polishing, and polishing the main surface of the circular glass plate with a polishing pad.

In order to increase recording capacity of the magnetic disk, it is necessary to enlarge a recording area, so that the main surface of the glass substrate for magnetic disk is desirably flat to more outer peripheral side. FIG. 1 is a cross-sectional view schematically illustrating the vicinity of end surface of the glass substrate for magnetic disk after polishing of the main surface. In the FIGURE, a is a chamfer surface (chamfered surface), b is an outer peripheral end surface, c is a main surface outer peripheral portion, d is a boundary between the chamfer surface a and the main surface outer peripheral portion c. Roll-off (end surface sagging) is continuously formed from the main surface outer peripheral portion c to the chamfer surface and hence the recording area is reduced.

Moreover, the straight line shown by a dotted line in FIG. 1 is a base line g for determining a degree of the roll-off. The base line g is determined as a straight line which overlaps with a portion f of the main surface outer peripheral portion c 2.5 mm or more and 5 mm or less apart from the boundary d toward the center of the main surface or as a straight line which comes nearest to the portion f. Of the main surface outer peripheral portion c, the portion 0.25 mm or more and 5 mm or less apart from the boundary d toward the center of the main surface is a roll-off measuring region e. The degree of the roll-off is a difference between the largest height and the smallest height of the main surface outer peripheral portion c from the base line g in the roll-off measuring region e.

Thus, in order to increase the recording capacity, it is essential to reduce the roll-off and hitherto, an improvement of the polishing pad has been performed. For example, polishing the glass plate with a polishing pad having an increased Asker-A hardness of 90 or more by containing a predetermined amount of an abrasive has been proposed (see, Patent Document 1).

Patent Document 1: JP-A-2007-250166

DISCLOSURE OF THE INVENTION

Problems that the Invention is to Solve

In the polishing pad described in Patent Document 1, in order to diminish the unevenness in stress distribution at polishing which is generated by deformation of the polishing pad, hardness of the polishing pad is increased to improve the end surface shape. However, when a polishing pad having a high hardness is used, there sometimes arise problems that scratches on the main surface increase to decrease flatness of the main surface and a polishing rate decreases at an early stage, as well as the roll-off is remarkably increased by polishing in many cases.

Accordingly, an object of the invention is to suppress the increase of the roll-off in the polishing step of the main surface of the circular glass plate at the production of the glass substrate for magnetic disk.

Means for Solving the Problems

As a result of the extensive studies for solving the above problems, the present inventors have found that a glass substrate is polished by relatively moving the glass substrate and polishing pads while feeding a slurry containing an abrasive in a state that front and back main surfaces are pressed with the polishing pads and, on this occasion, a polishing load imparted to the end surface of the glass surface layer sunk into the polishing pad can be alleviated to make a roll-off better by maintaining the hardness of the polishing pad surface layer, which comes into contact with the glass as an article to be polished, in a soft state.

Moreover, they have found that, by polishing the glass substrate after cleaning the polishing pad made of a foamed resin to remove a foaming aid added at the production of the pad, hardening of the pad resulting from aggregation and caking of abrasive grains onto the polishing pad surface layer during polishing can be suppressed though suppression of the aggregation of polishing abrasive grains which is generated by the reaction between the foaming aid and the polishing abrasive grains, and thus the deterioration of the roll-off can be inhibited. Furthermore, the decrease in polishing rate can be suppressed by washing out the foaming aid to suppress the aggregation of the polishing abrasive grains. In addition, it is also expected to have an influence on the decrease in remaining abrasive grains and scratches which may become surface defects.

Also, they have found that polishing resistance decreases and surface quality is stabilized in good conditions when an area-occupying ratio and an average circle equivalent diameter, in the polishing surface, of open pores or micropores on the polishing surface of the polishing pad fall within specific ranges. Furthermore, they have found that the foaming aid is highly washable and polishing can be effectively performed when the open pores are as above. In addition, by polishing the glass plate with a polishing pad having such open pores, the feeding of the slurry to the glass surface is effectively performed and the polishing can be performed with a high polishing ability.

The invention is based on such findings.

Namely, the invention provides a method for producing a glass substrate for magnetic disk, the method comprising: a step of polishing a main surface of a circular glass plate using a polishing pad made of a foamed resin while feeding a polishing liquid containing an abrasive, wherein a polishing pad made of a foamed resin having an international rubber hardness of 45 IRHD or less, the hardness being measured at a dry state before contact with a slurry by the M method defined in JIS K6253, is used as a starting polishing pad and the polishing is started after a polishing surface of the starting polishing pad is subjected to a dressing treatment to adjust the pad so that an open pore area ratio becomes 8% or more and an average circle equivalent diameter of open pores becomes 10 μm or more.

Moreover, the invention provides the method for producing a glass substrate for magnetic disk, wherein a creep/recovery characteristic is 30 or more when a load is applied in accordance with DIN ISO48 and then the load is released.

Moreover, the invention provides the method for producing a glass substrate for magnetic disk, wherein the starting polishing pad is a polishing pad obtained using a hydrophobic surfactant as a foaming aid, and the polishing pad is cleaned after the dressing treatment and before the polishing.

In addition, the invention provides the method for producing a glass substrate for magnetic disk, wherein, in the above step, a newly formed surface is exposed by subjecting the polishing surface of the polishing pad to the dressing treatment at the time when the difference between a roll-off value when the main surface of the circular glass plate is polished in an amount of 0.5 µm and a roll-off value before the polishing reaches 110 nm, and then the polishing is restarted.

ADVANTAGE OF THE INVENTION

By the polishing pad to be used in the invention, there can be effectively produced a glass substrate for magnetic disk which shows a small roll-off, that is, which has a wide recording area and hence is capable of a high recording capacity.

Moreover, as used, abrasive grains are aggregated and caked on the surface to harden the polishing pad and the roll-off characteristic becomes worse, but the polishing pad can be used over a long period of time with retaining stable quality characteristics by subjecting the pad to a dressing treatment to grind the polishing pad surface layer hardened through aggregation and caking of the abrasive grains and expose a newly formed surface and subsequently using the pad for polishing, so that production costs can be reduced.

Figure 1:
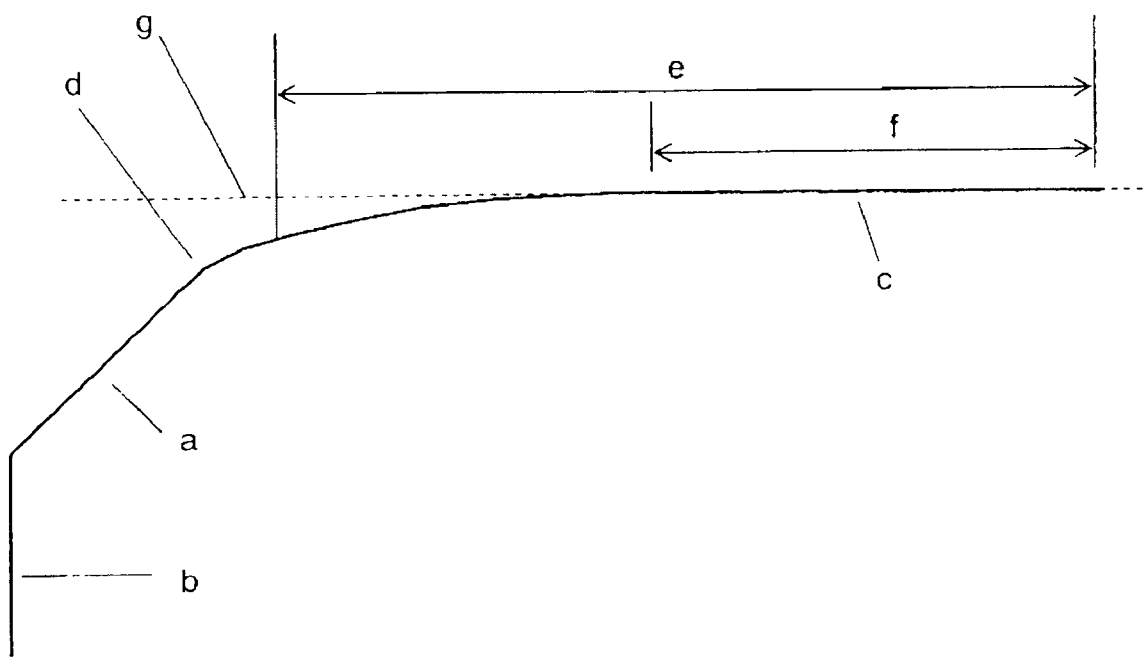
FIG. 1 is a schematic illustration showing the vicinity of outer peripheral portion of a circular glass substrate after polishing of the main surface.

DESCRIPTION OF REFERENCE NUMERALS AND SIGNS a: Chamfer surface
b: Outer peripheral end surface
c: Main surface outer peripheral portion
d: Boundary between the chamfer surface a and the main surface outer peripheral portion b
e: Roll-off measuring region
g: Base line for determining the degree of roll-off

BEST MODE FOR CARRYING OUT THE INVENTION

The following will explain the present invention in detail.

In the method for producing a glass substrate for magnetic disk according to the invention, a circular glass plate is treated through known steps until the polishing of the main surface.

For example, from a silicate glass formed by a float process, a doughnut-shaped circular glass plate (circular glass plate having a circular hole in the center) is cut out, and subjected to successive chamfering, main surface lapping, and end surface mirror polishing. The doughnut-shaped circular glass plate is prepared by cutting out a square glass plate, making a circular hole in the center, and subsequently shaping the plate to a circular shape, for example.

Moreover, the main surface-lapping step may be divided into a rough lapping step and a precise lapping step and a shape-processing step (hole making in the center of the circular glass plate, chamfering, and end surface mirror polishing) may be provided between them. After the main surface-polishing step, a chemical strengthening step may be provided. In this connection, in the case where a glass substrate having no circular hole in the center, as a matter of course, the hole making in the center of the circular glass plate is unnecessary.

Then, the main surface is polished. The polishing method may be performed in the same manner as conventional one and, for example, the polishing is carried out by holding the circular glass plate between two polishing pads and rotating the polishing pads while feeding a polishing liquid containing an abrasive into the interface between the polishing pads and the circular glass plate. In the invention, a polishing pad made of a foamed resin having an international rubber hardness of 45 IRHD or less, the hardness being measured at a dry state before contact with a slurry by the M method defined in JIS K6253, is used and, prior to its use, a polishing surface (surface which comes into contact with the circular glass plate) of the starting polishing pad is subjected to a dressing treatment to adjust the pad so that an open pore area ratio becomes 8% or more, preferably from 9 to 40% and an average circle equivalent diameter of open pores becomes 10 µm or more, preferably from 30 to 30 µm. The material and specification of the polishing pad is not particularly limited so far as it has such open pore area ratio and average circle equivalent diameter. A common foamed article made of a urethane, a polyurethane, a polyester, or the like can be used. A commercially available one may be used. Moreover, the dressing treatment can be also performed by any known methods and, for example, the surface layer of the polishing surface of the polishing pad is scraped off to a predetermined depth using a polishing plate to which diamond powder is adhered.

Herein, the international rubber hardness of the starting polishing pad measured by the M method defined in JIS K6253 is measured by means of a micro-size international rubber hardness meter: a plunger whose lower end is a spherical surface having a diameter of 0.4 mm is brought into contact with the polishing surface of the polishing pad vertically under 8.3 mN for 3 seconds (primary load), subsequently the plunger is pushed therein under 153.3 mN for 30 seconds (principal load), and the international rubber hardness is determined from the push-in depth at the principal load. In this connection, the corresponding international standard of JIS K6253 is DIN ISO48.

Moreover, the starting polishing pad preferably has a creep/recovery characteristic of 30 or more when the above principal load is released.

The creep/recovery characteristic (Range) is determined by determining a push-in depth 30 seconds after the release of the load after the principal load is applied for 30 seconds and subtracting the push-in depth at the principal load from the push-in depth after the principal load is released.

The polishing pad contains a large number of pores inside and a large number of micropores derived from opening of the pores are formed on the polishing surface. In the invention, the ratio of the micropores on the whole surface of the polishing surface is determined as the open pore area ratio. Moreover, the open pore is not necessarily a true circle and may show an ellipse or a complex shape but a diameter is calculated from open pore areas of individual open pores and determined as the circle equivalent diameter and an average value thereof is determined as the average circle equivalent diameter of open pores (average open pore diameter). When the open pore area ratio is less than 8%, polishing resistance is high and there is a concern that the circular glass plate may be broken during the polishing. In addition, there also arises a problem that the polishing liquid containing an abrasive is not efficiently fed to the interface between the polishing pads and the circular glass plate. When the average open pore diameter is less than 10 μm, there are problems that resistance at polishing is high and a stable polishing is impossible, the slurry feeding to the interface between the glass and the polishing pads is not efficiently performed, and the like. On the other hand, when the average open pore diameter is too large, large open pores are scattered about the polishing surface, so that a uniform polishing becomes impossible and hence surface characteristics become worse. Therefore, the upper limit of the average open pore diameter is preferably 50 μm.

Moreover, the foamed resin is produced by foaming a resin mixed with a foaming aid. However, among the materials to be used as the foaming aid, there is a surfactant which causes aggregation of the abrasive in the polishing slurry. When a highly hydrophobic surfactant remains in the polishing pad, it aggregates the abrasive in the polishing liquid. Thus, in the invention, it is preferred to clean the polishing pad by the dressing treatment to remove the remaining highly hydrophobic surfactant as far as possible. At that time, when the open pore area ratio is less than 8% or the average open pore diameter is less than 10 μm, the removal of the remaining hydrophobic surfactant by cleaning cannot be efficiently and sufficiently performed. In this connection, the degree of the removal of the remaining hydrophobic surfactant can be evaluated from the surface tension of the collected cleaning liquid or polishing slurry and when the static surface tension is 70 mN/m or more, the degree is considered to be good.

Examples of the highly hydrophobic surfactant include nonionic surfactants wherein an alkyl chain of C3 or more is added (polyoxyethylene alkyl ethers, polyoxypropylene alkyl ethers, polyoxyethylene polyoxypropylene alkyl ethers, perfluoroalkyl ethylene oxide adducts, glycerin aliphatic acid esters, propylene glycol aliphatic esters, etc.) and anionic surfactants (alkylcarboxylic acids).

In addition, in the case where nonionic water-soluble polymers such as polyvinyl alcohol and polyvinylpyrrolidone or acrylic acid-based copolymers which are anionic water-soluble polymers and contain a phenyl group (styrene-maleic acid-based polymers etc.) remain in the polishing pad, it is preferred to remove them by cleaning.

Furthermore, in the case where a polishing pad using a highly hydrophilic surfactant as the foaming aid is used, cleaning is usually unnecessary.

The open pore area ratio and the average open pore diameter can be adjusted by the foaming state of the foamed resin and the dressing (scraping) amount in the dressing treatment. For example, in the common polishing pad made of foamed polyurethane, the above open pore area ratio and average open pore diameter can be obtained by scraping the surface layer in a depth of several tens to several hundreds μm.

The polishing pad subjected to the dressing treatment as above preferably has a hardness of 92 or less and a creep/recovery characteristic of 6 or more measured using an IRHD super soft detector as a detector for a multipurpose automatic hardness meter for rubber, Digitest IRHD manufactured by H. Barleys Company. By the use of such a soft polishing pad, even when a glass substrate is sunk in the polishing pad during polishing, too much load is not applied on the substrate end surface and the substrate end surface is not grinded too much, so that a glass substrate for magnetic disk with a little roll-off can be obtained.

In this connection, the hardness of the polishing pad softened by wetting with water is determined using a plunger of the IRDH super soft detector made of H. Barleys Company as follows: the plunger whose lower end is a spherical surface having a diameter of 0.25 mm is brought into contact with the polishing surface of the polishing pad vertically under a light load for 3 seconds (primary load), subsequently the plunger is pushed therein under 100.0 mN as a total force applied at the front end sphere of the plunger for 30 seconds (principal load), and the hardness is determined from the push-in depth at the principal load.

The creep/recovery characteristic (Range) is determined using the IRHD super soft detector by determining a push-in depth 30 seconds after the release of the load after the principal load is applied for 30 seconds and subtracting the push-in depth at the principal load from the push-in depth after the principal load is released.

Moreover, the polishing liquid is not particularly limited and a known one can be employed. Generally, a polishing liquid using colloidal silica or fumed silica as an abrasive and mixed with various additives for enhancing a polishing efficiency has been used. Even in the invention, the liquid can be used. One example of the polishing liquid is shown below.

Colloidal silica is obtained by a water glass process wherein a silicic acid alkali metal salt such as sodium silicate is used as a raw material and is subjected to condensation reaction in an aqueous solution to allow particles to grow or by an alkoxysilane process wherein an alkoxysilane such as tetraethoxysilane is used as a raw material and is subjected to condensation reaction in water containing a water-soluble organic solvent such as an alcohol to allow particles to grow.

Fumed silica is obtained by a vapor phase process wherein a volatile silicon compound such as silicon tetrachloride is used as a raw material and is hydrolyzed under a high temperature of 1000° C. or higher obtained by an oxygen-hydrogen burner to allow particles to grow.

In addition, there may be also employed those obtained by subjecting the silica to surface modification with a functional group, those wherein functional group conditions of the surface, zeta potential, and/or particle hardness are modified by doping with the other element such as aluminum, those obtained by formation of composite particles with a surfactant or other particles, and the like.

In particular, in view of reducing surface roughness and scratches on the substrate surface, colloidal silica is preferred. The silica may be used singly or as a mixture of two or more thereof.

The average particle size of the primary particle of the silica is from 1 to 100 nm. The average particle size thereof is preferably from 1 to 80 nm, more preferably from 3 to 60 nm, further preferably from 5 to 40 nm in view of reducing scratches, in view of reducing surface roughness, and in view of securing polishing rate. In the invention, a faster polishing rate is preferred and the rate is preferably 0.03 μm/min or more. Also, with regard to the surface roughness (Ra) measured by AFM (atomic force microscope), a smaller value is more preferable and the roughness is preferably 0.2 nm or less. With regard to the micro-waviness (μWa) measured by a scanning white light interferometer, a smaller value is more preferred and the micro-waviness is preferably 0.2 nm or less.

Moreover, the content of the silica in the polishing liquid is typically from 5 to 40% by mass.

The polishing liquid is adjusted to be acidic by adding an acid. The acidity is not particularly limited but is preferably controlled to be pH 1 to 6, more preferably pH 4 or lower, since peripheral members of a polishing machine tend to be deteriorated when the acidity is too high, while when the acidity is low, the glass surface is difficult to soften (a hydrated layer on the glass surface layer is difficult to form) and hence a polishing rate decreases. As the acid to be used, inorganic acids such as nitric acid, hydrochloric acid, and sulfuric acid and organic acids can be employed. Moreover, in order to suppress a pH variation (pH elevation) during polishing, the polishing liquid may be adjusted to be acidic with imparting a buffering effect.

As the additives, those having no charge (nonionic) or minus charge (anionic) are preferred from the viewpoint of cleaning ability, and there may be added anionic polymers and polyhydric alcohols (ethylene glycol, glycerin, sorbitol, mannitol, diglycerin, etc.) for prevention of drying, organic acids (gluconic acid, citric acid, malic acid, succinic acid, tartaric acid, acetic acid, oxalic acid, etc.), anionic polymers and saccharides (trehalose, Finetose, pullulan, etc.) and cellulose-based polymers (hydroxyethylcellulose, hydroxypropylcellulose, carboxymethylcellulose, etc.) for covering and protecting the glass surface to achieve selective polishing, polymers containing a phenyl group or a naphthalene group (polystyrenesulfonic acid, phenolsulfonic acid-formalin condensates, naphthalenesulfonic acid-formalin condensates, etc.), anionic surfactants (alkylsulfonic acids, alkylbenzenesulfonic acids, alkylnaphthalenesulfonic acids, alkyldiphenyl-ether-disulfonic acids, arylphenolsulfonic acid-formaldehyde condensates, dibutylnaphthalenesulfonic acids, etc.), and the like, in appropriate amounts.

The polishing conditions are not particularly limited but the polishing pressure is preferably 4 kPa or more. When the pressure is less than 4 kPa, the stability of the circular glass plate at polishing decreases and the plate tends to flop. As a result, there is a concern that the waviness of the main surface becomes large. Moreover, the polishing amount of the main surface is appropriately from 0.3 to 1.5 µm and the feeding amount of the polishing liquid and polishing time, silica concentration in the polishing liquid, the polishing pressure, the number of rotation, and the like may be adjusted.

In this connection, before the above polishing of the main surface, the main surface may be preliminarily polished. The preliminary polishing of the main surface can be effected, for example, by holding the circular glass plate between the polishing pads and rotating the polishing pads while feeding a slurry of cerium oxide abrasive particles.

Then, after the above polishing of the main surface, the glass plate is cleaned and dried to obtain a glass substrate for magnetic disk. The cleaning and drying are performed by known methods but, for example, immersion into an acidic detergent solution, immersion into an alkaline detergent solution, scrub cleaning with Belclean and an alkaline detergent, ultrasonic cleaning in an immersed state in an alkaline detergent solution, and ultrasonic cleaning in an immersed state in pure water are successively performed and then drying is carried out by a method of spin-dry drying, drying with isopropyl alcohol vapor, or the like.

Moreover, the polishing pad used in the polishing is hardened through aggregation and caking of the abrasive on the polishing surface and the international rubber hardness measured by the above M method is apt to be 50 IRHD or more. Namely, when polishing is performed using the polishing pad which has had an international rubber hardness of 50 IRHD or more, the roll-off tends to become worse. Therefore, in the invention, it is preferred to make the polishing pad usable again for polishing by subjecting the hardened polishing surface to the dressing treatment to grind the surface and expose a newly formed surface, whereby a soft polishing surface is regenerated.

In this connection, the indication for the re-dressing treatment is a time point when the roll-off is changed in a value of 110 nm from the roll-off before polishing, when a product immediately after the preparation is sampled at the polishing amount of 0.5 µm and the roll-off is measured.

A part or all of the invention may be diverted to polishing of a photomask or an optical filter. For example, a diversion may be performed, wherein a polishing pad subjected to the dressing treatment beforehand is used as a starting polishing pad in the polishing step, the dressing treatment is performed on a polishing pad made of a foamed resin having an international rubber hardness of 45 IRHD or less, the hardness being measured at a dry state before contact with a slurry by the M method defined in JIS K6253, and the open pore area ratio or the average circle equivalent diameter of open pore of such a starting polishing pad is adjusted so as to be the same as the one of the starting polishing pad of the invention, or the like.

EXAMPLES

The following will further illustrate the present invention with reference to Examples and Comparative Examples but the invention should not be construed as being limited thereto.
(Preparation of Test Article)

A silicate glass plate shaped by a float process is processed into a doughnut-shaped circular glass plate (circular glass plate having a circular hole in the center) so as to be able to obtain a glass substrate having an outer diameter of 65 mm, an inner diameter of 20 mm, and a plate thickness of 0.635 mm. In this connection, the grinding processing on the inner peripheral surface and the outer peripheral surface was carried out using a diamond grindstone and the lapping on the upper and lower surfaces of the glass plate was carried out using aluminum oxide abrasive grain.

Next, the end surfaces of the inner and outer peripheries were subjected to chamfering processing so that a chamfering width became 0.15 mm and a chamfering angle became 45°. After the processing on the inner and outer peripheries, mirror processing on the end surfaces was carried out by brushing using a cerium oxide slurry as an abrasive and using a brush as a polishing tool. The processing amount was 30 µm as a removed amount in the radial direction.

Thereafter, using a cerium oxide slurry (average particle size of cerium oxide: about 1.1 µm) as an abrasive and using a urethane pad as a polishing tool, polishing processing on the upper and lower main surfaces was carried out by means of a double side polishing apparatus. The processed amount was 35 µm in total in the thickness direction of the upper and lower main surfaces.

Furthermore, using a cerium oxide (average particle size: about 0.2 µm), which had an average particle size smaller than that of the above cerium oxide, as an abrasive and using a urethane pad as a polishing tool, polishing processing on the upper and lower main surfaces was carried out by means of a double side polishing apparatus. The processed amount was 1.6 µm in total in the thickness direction of the upper and lower main surfaces.
(Selection and Adjustment of Polishing Pad)

Among the polishing pads made of a foamed polyurethane produced using as a foaming aid a nonionic surfactant wherein an alkyl chain of C3 or more was added, a polishing pad made of a foamed polyurethane having a soft surface layer was selected, of which international rubber hardness measured at a dried state by the above M method was from 33 to 40 IRHD. In this connection, the international rubber hardness measured by the above M method was measured using an IRHD micro detector on an IRHD-micro hardness meter (multipurpose automatic hardness meter for rubber Digitest IRHD manufactured by H. Barleys Company).

The selected polishing pad made of the foamed polyurethane was attached to the surface plate (outer diameter: 640 mm, inner diameter: 230 mm, width of the polishing pad in the radial direction: 410 mm) of a polishing machine and the polishing surface was subjected to a dressing treatment using a polishing plate on which diamond powder was fixed, whereby the surface layer was scraped off. The dressing treatment was carried out at a step where the polishing pad was polished at reverse rotation and subsequently polished at normal rotation for respective periods of time shown in Table 1, and then was brush-cleaned for 3 minutes while feeding pure water.

A laser microscopic image (a color 3D laser microscope VK-9700, VK-9710 manufactured by Keyence Corporation) of the treated surface was taken and the open pore area ratio and the average circle equivalent diameter were calculated using an image analyzing apparatus (Application for analysis VK-H1A1 manufactured by Keyence Corporation). Moreover, an SEM photograph (a 3D real surface view microscope VE-9800 manufactured by Keyence Corporation) of the cross-section of the polishing pad was taken and the dressing amount of the polishing pad surface layer was confirmed. The measured points are 6 points in total, i.e., an ID portion (inner diameter side; 20 mm from the inner diameter end), an MD portion (central portion; 100 mm from the inner diameter end), and an OD portion (outer diameter side; 190 mm from the inner diameter end) of the polishing pad of each of the upper surface plate and the lower surface plate of the polishing machine. In Table 1, the open pore area ratio and the average open pore diameter of the ID portion, the MD portion, and the OD portion of the upper surface plate were described. In Comparative Example 1, the open pores at the ID portion and the OD portion of the polishing pad of the upper surface plate are insufficient.

The confirmation whether the washing of the surfactant as the foaming aid was sufficiently performed by making open pores on the polishing pad surface layer by the dressing treatment and brush-cleaning with pure water was carried out by evaluating characteristics of the collected slurry after polishing when the glass substrate was polished with a colloidal silica-containing slurry. Namely, 5 minutes after the start of the following polishing, the slurry was collected and the measurement of static surface tension (measured on CBVP-Z manufactured by Kyowa Interface Science Co., Ltd. at room temperature) and the measurement of particle size distribution (Microtrack UPA150 manufactured by Nikkiso Co., Ltd.) were carried out on the collected slurry. By the static surface tension, the presence of decrease in surface tension owing to the elution of the surfactant can be evaluated and when the static surface tension was 70 mN/m or more, it was judged that the surfactant in the polishing pad could be almost washed out and thus it was possible to start a stable polishing. In this connection, by evaluating the particle size distribution state of colloidal silica by the measurement of particle size distribution (dynamic light scattering method), the aggregation state of colloidal silica induced by the surfactant eluted from the polishing pad was confirmed. The aggregation of colloidal silica in the collected slurry was suppressed as the value of the static surface tension increases, that is, as the elution of the surfactant decreases. Table 1 shows surface tension and particle size distribution at every time of polishing. In this connection, brush-cleaning is carried out for 3 minutes between individual polishing.

(Polishing of Circular Glass Plate)

Using a polishing machine having attached thereto a polishing pad, which had been subjected to dressing treatment, a test article was polished after the polishing pad was cleaned with water. In the polishing liquid, a colloidal silica slurry (average particle size of primary particles: 20 to 30 nm, silica particle concentration: 48% by weight) was used as a raw material, the silica concentration in the composition for polishing was adjusted with pure water so as to be 15% by mass, and pH was adjusted with nitric acid so as to be 2. Using a 9B type double side polisher manufactured by Speedfam Co., Ltd. as a polishing machine, polishing was carried out at a polishing pressure of 12 kPa, a carrier peripheral velocity of 40 m/min, and a polishing liquid feeding rate of 60 ml/min for 10 min. The polishing was performed so that the polishing amount was 0.5 μm at one surface. Then, the test article after polishing was subjected to immersion into an acidic detergent solution, immersion into an alkaline detergent solution, scrub cleaning with Belclean and an alkaline detergent, immersion into an alkaline detergent solution, scrub cleaning with Belclean and an alkaline detergent, ultrasonic cleaning in an immersed state in an alkaline detergent solution, and ultrasonic cleaning in an immersed state in pure water, successively, followed by spin-dry drying.

After each completion of the polishing, the roll-off value of the test article was measured by means of a scanning white light interferometer New View 5032 manufactured by Zygo Company. The measurement was carried out at the same point before and after polishing by substrate end surface measurement (roll-off measurement) and a change in roll-off (degree of sagging at end surface) between before and after polishing was evaluated. The results are shown in Table 1 and a smaller numeric value represents smaller end surface sagging and is preferable.

TABLE 1

| | | Example 1 | Example 2 | Example 3 | Comparative Example 1 |
|---|---|---|---|---|---|
| Dressing conditions | Reverse rotation dressing time total [min] | 12 | 8 | 6 | 2 |
| | Normal rotation dressing time total [min] | 12 | 8 | 6 | 2 |
| | Brush-cleaning time total [min] | 3 | 3 | 3 | 3 |
| | Dressing amount of polishing pad surface layer Ave. [μm] | 91 | 55 | 33 | 29 |
| Evaluation of polishing pad | Open pore area ratio [%] | | | | |
| | upper surface plate ID portion | 18.4 | 8.6 | 13.3 | 0 |
| | upper surface plate MD portion | 20.9 | 18.3 | 17.1 | 19.2 |
| | upper surface plate OD portion | 19.3 | 14 | 12.9 | 4 |

TABLE 1-continued

|  |  | Example 1 | Example 2 | Example 3 | Comparative Example 1 |
|---|---|---|---|---|---|
|  | Average circle equivalent diameter [μm] |  |  |  |  |
|  | upper surface plate ID portion | 15.7 | 11.3 | 15.8 | 0 |
|  | upper surface plate MD portion | 19.1 | 19.5 | 17.2 | 19.9 |
|  | upper surface plate OD portion | 17.4 | 15.6 | 15.2 | 8.8 |
| Evaluation of | Surface tension [mN/m] @25° C. |  |  |  |  |
| collected slurry | on 1st batch | 68 | 67 | 69 | 57 |
| after polishing | on 3rd batch | 70 | 70 | 70 | 65 |
|  | on 5th batch | 70 | 70 | 70 | 68 |
|  | on 8th batch | 70 | 70 | 70 | 70 |
|  | Particle size distribution D50 [nm] |  |  |  |  |
|  | on 1st batch | 2023 | 303 | 857 | 1550 |
|  | on 3rd batch | 45 | 36 | 35 | 62 |
|  | on 5th batch | 36 | 35 | 32 | 41 |
|  | on 8th batch | 35 | 34 | 33 | 39 |
| Evaluation of substrate surface | Change in roll-off (polishing amount 0.5 [μm] normalized) |  |  |  |  |
|  | on 1st batch | 40.0 | 47.1 | 54.5 | 28.8 |
|  | on 3rd batch | 51.7 | 68.6 | 74.3 | 99.6 |
|  | on 5th batch | 70.2 | 64.9 | 68.3 | 111.6 |
|  | on 8th batch | 87.1 | 71.0 | 86.2 | 106.7 |

As shown in Table 1, according to the invention, it is revealed that, by polishing with a polishing pad wherein an open pore area ratio is 8% or more or an average circle equivalent diameter of open pores is 10 μm or more by the dressing treatment, the washing of the surfactant as a foaming aid remaining in the polishing pad is promptly carried out and the aggregation of colloidal silica in the polishing slurry is suppressed to allow stable polishing. Furthermore, it is also revealed that since such polishing also suppresses deterioration of roll-off which is induced though hardening of the surface layer of the polishing pad by aggregation and caking of colloidal silica on the polishing pad surface layer, the roll-off can be suppressed to a low value and further a stable polishing can be performed with little change in polishing characteristics.

In addition, the polishing rate was measured by a weight method, surface roughness (Ra) by AFM, and surface waviness (μWa) by a scanning white light interferometer. In Examples and Comparative Examples, the polishing rate was 0.03 μm/min or more in all polishing batches. The surface roughness (Ra) was 0.2 nm or less in all polishing batches. Since the surface roughness of the polishing pad was uneven immediately after the dressing treatment, the surface waviness (μWa) was 0.2 nm or more in some cases but was 0.2 nm or less in and after second batch.

(Regeneration of Polishing Pad)

After polishing was performed in the same manner as above using a polishing pad obtained by subjecting the same commercially available polishing pad as the one used in Examples 1 to 3 to a dressing treatment under the conditions shown in Table 2, brush-cleaning was carried out and then the pad was allowed to stand for one day (Example 4). With the brush-cleaning, since washing of the slurry abrasive grains in the micropores of the polishing pad and washing and removal of the abrasive grains attached to the surface of the polishing pad were insufficient, colloidal silica in the polishing slurry was aggregated and caked to harden the surface layer. Therefore, the polishing pad surface layer was scraped off by the dressing treatment to expose as a surface layer a new polishing pad surface where colloidal silica is not aggregated and caked, namely, to expose a newly formed surface, whereby regeneration of the polishing pad was performed. In this connection, as the dressing treatment at the regeneration of the polishing pad, the pad was polished at reverse rotation for 1 minute and subsequently at normal rotation for 1 minute, and then was brush-cleaned with pure water for 3 minutes. Using the regenerated polishing pad, the main surface of the circular glass plate was polished in the same manner as above and the roll-off was measured.

Furthermore, after polishing, the polishing pad was brush-cleaned and allowed to stand for another one day. Then, a dressing treatment was again carried out under the same conditions, the main surface of the circular glass plate was polished in the same manner as above, and the roll-off was measured.

The results are shown in Table 2. Thus, by regenerating the polishing pad by the dressing treatment, it is revealed that the deteriorated roll-off is improved and the polishing pad can be used over a long period of time by the regeneration treatment without problems.

For comparison, after the polishing pad of Comparative Example 1 used in the above polishing was brush-cleaned, the pad was allowed to stand for another one day (Comparative Example 2). Without regeneration by the dressing treatment, the main surface of a similar circular glass plate was polished. The results are also shown in Table 2. A change in roll-off is remarkably increased.

TABLE 2

| | | Example 4 | Comparative Example 2 |
|---|---|---|---|
| Dressing conditions | Reverse rotation dressing time total [min] | 8 | 2 |
| | Normal rotation dressing time total [min] | 8 | 2 |
| | Brush-cleaning time total [min] | 3 | 3 |
| | Dressing amount of polishing pad surface layer Ave. [μm] | 51 | 29 |
| Evaluation of polishing pad | Open pore area ratio [%] | | |
| | upper surface plate ID portion | 18.2 | 0 |
| | upper surface plate MD portion | 16.8 | 19.2 |
| | upper surface plate OD portion | 16 | 4 |
| | Average circle equivalent diameter [μm] | | |
| | upper surface plate ID portion | 16 | 0 |
| | upper surface plate MD portion | 18.1 | 19.9 |
| | upper surface plate OD portion | 16.3 | 88 |
| First time evaluation of substrate surface | Change in roll-off (polishing amount 0.5 [μm] normalized) | | |
| | average value of 1st to 8th batches | 71.2 | 82.4 |
| Evaluation of substrate surface after standing for 1 day | Change in roll-off (polishing amount 0.5 [μm] normalized) | | |
| | average value of 9th to 12th batches | 119.5 | 107.4 |
| Regeneration of polishing pad Dressing conditions | Reverse rotation dressing time total [min] | 1 | * |
| | Normal rotation dressing time total [min] | 1 | * |
| Evaluation of substrate surface after standing for 1 day + regeneration treatment | Change in roll-off (polishing amount 0.5 [μm] normalized) | | |
| | average value of 13th to 16th batches | 94.0 | 111.6 |
| Evaluation of substrate surface after standing for another 1 day | Change in roll-off (polishing amount 0.5 [μm] normalized) | | |
| | average value of 17th to 20th batches | 119.4 | * |
| Regeneration of polishing pad Dressing conditions | Reverse rotation dressing time total [min] | 1 | * |
| | Normal rotation dressing time total [min] | 1 | * |
| Evaluation of substrate surface after standing for another 1 day + regeneration treatment | Change in roll-off (polishing amount 0.5 [μm] normalized) | | |
| | average value of 21st to 24th batches | 83.1 | * |

While the invention has been described in detail and with reference to specific embodiments thereof, it will be apparent to one skilled in the art that various changes and modifications can be made therein without departing from the spirit and scope thereof.

The present application is based on Japanese Patent Application No. 2008-19118 filed on Jan. 30, 2008, and the contents are incorporated herein by reference.

INDUSTRIAL APPLICABILITY

By suppressing increase in roll-off at the time when the main surface of a circular glass plate is polished in the production of a glass substrate for magnetic disk, it becomes possible to increase recording capacity of magnetic disk.

The invention claimed is:

1. A method for producing a glass substrate for magnetic disk, said method comprising:
    a step of polishing a main surface of a circular glass plate using a polishing pad made of a foamed resin while feeding a polishing liquid containing an abrasive,
    wherein a polishing pad made of a foamed resin having an international rubber hardness of 45 IRHD or less, the hardness being measured at a dry state before contact with a slurry by the M method defined in JIS K6253, is used as a starting polishing pad and the polishing is started after a polishing surface of the starting polishing pad is subjected to a dressing treatment to adjust the pad so that an open pore area ratio becomes 8% or more and an average circle equivalent diameter of open pores becomes 10 μm or more.

2. The method for producing a glass substrate for magnetic disk according to claim 1, wherein the starting polishing pad is a polishing pad obtained using a hydrophobic surfactant as a foaming aid, and the polishing pad is cleaned after the dressing treatment and before the polishing.

3. The method for producing a glass substrate for magnetic disk according to claim 1, wherein, during said polishing step, a newly formed surface of said polishing pad is exposed by subjecting the polishing surface of the polishing pad to the dressing treatment at the time when a difference between a roll-off value when the main surface of the circular glass plate is polished in an amount of 0.5 μm and a roll-off value before the polishing reaches 110 nm, and then the polishing is restarted.

4. The method for producing a glass substrate for magnetic disk according to claim 2, wherein, during said polishing step, a newly formed surface of said polishing pad is exposed by subjecting the polishing surface of the polishing pad to the dressing treatment at the time when a difference between a roll-off value when the main surface of the circular glass plate is polished in an amount of 0.5 μm and a roll-off value before the polishing reaches 110 nm, and then the polishing is restarted.

* * * * *